US007535866B2

(12) United States Patent
Kimble et al.

(10) Patent No.: US 7,535,866 B2
(45) Date of Patent: May 19, 2009

(54) DEPLOYMENT PROCESSES FOR NEW TECHNOLOGY SYSTEMS

(75) Inventors: Bruce Kimble, Corona del Mar, CA (US); Michail Tsatsanis, Huntington Beach, CA (US)

(73) Assignee: Aktino, Inc., Irvine, CA (US)

( * ) Notice: Subject to any disclaimer, the term of this patent is extended or adjusted under 35 U.S.C. 154(b) by 1145 days.

(21) Appl. No.: 10/794,926

(22) Filed: Mar. 5, 2004

(65) Prior Publication Data
US 2005/0129218 A1 Jun. 16, 2005

Related U.S. Application Data

(60) Provisional application No. 60/530,092, filed on Dec. 15, 2003.

(51) Int. Cl.
*H04W 4/00* (2009.01)
(52) U.S. Cl. .................. 370/328; 370/334; 375/260
(58) Field of Classification Search ............ 379/242, 379/1.04; 370/335, 360, 437, 328, 334; 705/7; 375/260
See application file for complete search history.

(56) References Cited

U.S. PATENT DOCUMENTS

| 5,831,979 | A | * | 11/1998 | Byers | 370/360 |
|---|---|---|---|---|---|
| 5,920,846 | A | * | 7/1999 | Storch et al. | 705/7 |
| 6,381,248 | B1 | * | 4/2002 | Lu | 370/437 |
| 7,263,174 | B2 | * | 8/2007 | Schmidt et al. | 379/1.04 |
| 7,301,924 | B1 | * | 11/2007 | Gurbuz et al. | 370/335 |
| 2003/0235167 | A1 | * | 12/2003 | Kuffner | 370/335 |
| 2005/0135566 | A1 | * | 6/2005 | Schmidt et al. | 379/1.04 |

\* cited by examiner

*Primary Examiner*—Ahmad F Matar
*Assistant Examiner*—Antim Shah
(74) *Attorney, Agent, or Firm*—Perkins Coie LLP

(57) ABSTRACT

A method and apparatus for deploying new technology such as MIMO transmission technology in a geographically distributed network such as a telecommunications network is provided. In one embodiment, the invention is a method of installing new technology in an existing geographically distributed network. The method includes dedicating network resources of the geographically distributed network for the new technology to produce dedicated network resources of the geographically distributed network. The method also includes installing a component for the new technology at a centralized network facility of the geographically distributed network. Moreover, the method includes coupling the dedicated network resources of the geographically distributed network to the component. The method may further include installing subscriber equipment at subscriber sites. The new technology may be MIMO transmission technology.

3 Claims, 10 Drawing Sheets

DEPLOYMENT PROCESSES FOR NEW TECHNOLOGY SYSTEMS

CROSS-REFERENCE AND CLAIM OF PRIORITY

This application claims priority to U.S. provisional application No. 60/530,092 entitled "INITIAL DEPLOYMENT MIMO SYSTEMS" and filed on Dec. 15, 2003. Provisional application No. 60/530,092 is hereby incorporated herein by reference.

FIELD

The present invention relates to the field of telecommunications generally and upgrading telecommunications equipment in particular.

BACKGROUND

It is well known to DSL engineers that crosstalk interactions among the twisted copper pairs in a binder group present one of the biggest performance bottlenecks in modern DSL systems. Crosstalk is generated because of electromagnetic coupling among the pairs and can be due to near-end (NEXT) or far-end (FEXT) transmissions as shown in FIG. 1.

Referring in particular to FIG. 1, lines 120, 130, 140 and 150 are carried within a binder 110. Line 1 (120) and line 2 (130) experience near-end crosstalk 160. Line 2 (130) and line 3 (140) experience far-end crosstalk 170. In each situation, the signal-to-noise ratio decreases (more noise) and transmission quality degrades.

Several methods have been devised to control the detrimental effects of crosstalk and allow multiple services to co-exist in a binder group. They are based on limiting either the power or the bandwidth that the transceiver uses, so that its harmful effects on other services are within acceptable limits. In North America this set of guidelines has been compiled into an ANSI-T1 spectrum management standard.

Spectral management guidelines are useful in policing harmful emissions in the network but they do not actively control or compensate for the effects of crosstalk. Even with those guidelines, crosstalk still is the number one performance impairment for all services in the binder. Novel technologies that hold significant promise in combating crosstalk impairments irrespective of the spectral masks used, are based on joint processing of multiple signals from many pairs and come under the name Multi-Input-Multi-Output (MIMO) processing or vectored transmission.

MIMO techniques have been proposed for many diverse applications where information is transmitted through multiple channels which interact with each other. Examples include wireless LAN (IEEE 802.11) and wireless access (IEEE 802.16) systems as well as 10G Ethernet transceivers. Their application to the local loop network holds the promise of mitigating the crosstalk bottleneck and offering a new level of performance for copper based services.

The local loop however, offers a number of challenges to the introduction of these technologies. Contrary to other areas where MIMO has been successfully applied (e.g., wireless), the copper network always has to contend with legacy equipment and its effect on the new technologies. Only in very few cases (like in VDSL deployments) can one reasonably expect a "greenfield" application.

In most other cases, "forklift upgrades" are prohibitively expensive and new technologies have to be introduced in an evolutionary fashion. Furthermore, the structure of the local loop network itself and the deployment practices of the carriers have to be well understood in order to incorporate the technology in appropriate equipment, services and deployments that will make its introduction a success.

Thus, it may be useful to examine MIMO technologies from an outside plant point of view. The signal processing details of the technology need not be fully described to understand the challenges inherent in the local loop portion of networks. The effects on network planning, provisioning and deployment practices of MIMO deployment may produce a barrier to entry for this technology, and it may be useful to minimize these effects.

SUMMARY

The present invention is described and illustrated in conjunction with systems, apparatuses and methods of varying scope. In addition to the aspects of the present invention described in this summary, further aspects of the invention will become apparent by reference to the drawings and by reading the detailed description that follows.

A method and apparatus for deploying new technology such as MIMO transmission technology in a geographically distributed network such as a telecommunications network is provided. In one embodiment, the invention is a method of installing new technology in an existing geographically distributed network. The method includes dedicating network resources of the geographically distributed network for the new technology to produce dedicated network resources of the geographically distributed network. The method also includes installing a component for the new technology at a centralized network facility of the geographically distributed network. Moreover, the method includes coupling the dedicated network resources of the geographically distributed network to the component. The method may further include installing subscriber equipment at subscriber sites. The new technology may be MIMO transmission technology.

In another embodiment, the invention is a telecommunications system. The system includes a set of distributed twisted pair copper lines. The system further includes a first set of binders, with each binder of the first set of binders including a plurality of twisted pair copper lines. The system also includes a first interconnect. The first interconnect has a set of couplings. Twisted pairs of copper lines of the set of distributed twisted pair copper lines are coupled to couplings of the set of couplings of the first interconnect. Twisted pairs of the binders of the first set of binders are also coupled to couplings of the set of couplings of the first interconnect. Additionally, the system includes a second interconnect, the second interconnect having a set of couplings. Twisted pairs of the binders of the first set of binders are coupled to couplings of the set of couplings of the second interconnect. Telecommunications equipment is coupled to the couplings of the set of couplings of the second interconnect. Moreover, the system includes a second set of one or more binders, each binder of the second set of binders including a plurality of twisted pair copper lines. Each binder of the second set of binders is dedicated to a predetermined application. Twisted pairs of the binders of the second set of binders are coupled to couplings of the set of couplings of the first interconnect. Twisted pairs of the binders of the second set of binders are coupled to dedicated couplings of the set of couplings of the second interconnect. The dedicated couplings of the set of couplings of the second interconnect are coupled to equipment for the predetermined application.

In yet another embodiment, the invention is a method of installing new technology at a central office in an existing geographically distributed network. The method includes dedicating network resources of the geographically distributed network for the new technology to produce dedicated network resources of the geographically distributed network. The dedicated network resources include a dedicated portion of a previously existing interconnect at the central office and a set of binders, each binder including a plurality of twisted pairs of copper wire. Each binder of the set of binders is suitable to be coupled to the interconnect. The method also includes installing a component for the new technology at a centralized network facility of the geographically distributed network. The method further includes coupling the dedicated network resources of the geographically distributed network to the component.

In still another embodiment, the invention is a telecommunications system. The system includes a first set of binders, each binder of the first set of binders includes a plurality of twisted pair copper lines. The system further includes an interconnect, the interconnect having a set of couplings. The twisted pairs of the binders of the first set of binders are coupled to couplings of the set of couplings of the interconnect. The telecommunications equipment is coupled to the couplings of the set of couplings of the interconnect. Also, the system includes a second set of one or more binders, each binder of the second set of binders including a plurality of twisted pair copper lines. Each binder of the second set of binders is dedicated to a predetermined application. Twisted pairs of the binders of the second set of binders are coupled to dedicated couplings of the set of couplings of the interconnect. The dedicated couplings of the set of couplings of the interconnect are coupled to equipment for the predetermined application.

In yet another embodiment, the invention is a telecommunications system. The system includes a set of distributed twisted pair copper lines. The system further includes an interconnect, the interconnect having a set of couplings. Twisted pairs of copper lines of the set of distributed twisted pair copper lines are coupled to couplings of the set of couplings. The system also includes a first set of binders. Each binder of the first set of binders includes a plurality of twisted pair copper lines. Twisted pairs of the binders of the first set of binders are coupled to couplings of the set of couplings. Moreover, the system includes a second set of one or more binders. Each binder of the second set of binders includes a plurality of twisted pair copper lines. Each binder of the second set of binders is dedicated to a predetermined application. Twisted pairs of the binders of the second set of binders are coupled to couplings of the set of couplings.

In still another embodiment, the invention is a method of installing new technology in an existing geographically distributed network. The method includes receiving a request for new technology for the geographically distributed network. The method also includes installing a component for the new technology at a centralized network facility of the geographically distributed network. The method further includes coupling dedicated network resources of the geographically distributed network to the component.

In another embodiment, the invention is a method of installing new technology at a local facility in an existing geographically distributed network. The method includes dedicating network resources of the geographically distributed network for the new technology to produce dedicated network resources of the geographically distributed network. The dedicated network resources include a set of binders, each binder including a plurality of twisted pairs of copper wire. The method also includes coupling a subset of the dedicated network resources to an interconnect of the local facility.

In yet another embodiment, the invention is a method of installing MIMO technology in an existing geographically distributed network. The method includes dedicating network resources of the geographically distributed network for the MIMO technology to produce dedicated network resources of the geographically distributed network. The method further includes installing a MIMO transceiver for the new technology at a centralized network facility of the geographically distributed network. The method also includes coupling the dedicated network resources of the geographically distributed network to the MIMO transceiver.

In still another embodiment, the invention is a method of installing MIMO technology at a central office in an existing geographically distributed network. The method includes dedicating network resources of the geographically distributed network for the MIMO technology to produce dedicated network resources of the geographically distributed network. The dedicated network resources include a dedicated portion of a previously existing interconnect at the central office. The dedicated network resources also include a set of binders. Each binder includes a plurality of twisted pairs of copper wire, and each binder of the set of binders is suitable to be coupled to the interconnect. The method also includes installing a MIMO transceiver for the new technology at the central office. The method further includes coupling the dedicated network resources of the geographically distributed network to the MIMO transceiver.

In another embodiment, the invention is a method of installing MIMO technology at a local facility in an existing geographically distributed network. The method includes dedicating network resources of the geographically distributed network for the new technology to produce dedicated network resources of the geographically distributed network. The method further includes coupling a subset of the dedicated network resources to an interconnect of the local facility.

In yet another embodiment, the invention is a telecommunications system. The system includes a means for distributing signals to subscribers. The system also includes a first means for distributing sets of signals within a telecommunications network. The system further includes a means for bridging between the means for distributing signals and the first means for distributing sets of signals. Also, the system includes a means for bridging to the first means for distributing sets of signals. Moreover, the system includes a second means for distributing sets of signals within a telecommunications network. The second means is for distributing sets of signals dedicated to a new technology. The means for bridging to the first means for distributing sets of signals is also for bridging to the second means for distributing sets of signals. The means for bridging between the means for distributing and the first means for distributing sets of signals is also for bridging between the means for distributing and the second means for distributing sets of signals.

In still another embodiment, the invention is a method of installing MIMO technology in an existing geographically distributed network. The method includes first, dedicating network resources of the geographically distributed network for the MIMO technology to produce dedicated network resources of the geographically distributed network. Next, the method includes second, installing a MIMO transceiver for the new technology at a centralized network facility of the geographically distributed network. Then, the method includes third, coupling the dedicated network resources of the geographically distributed network to the MIMO transceiver.

DETAILED DESCRIPTION

Figure 1:
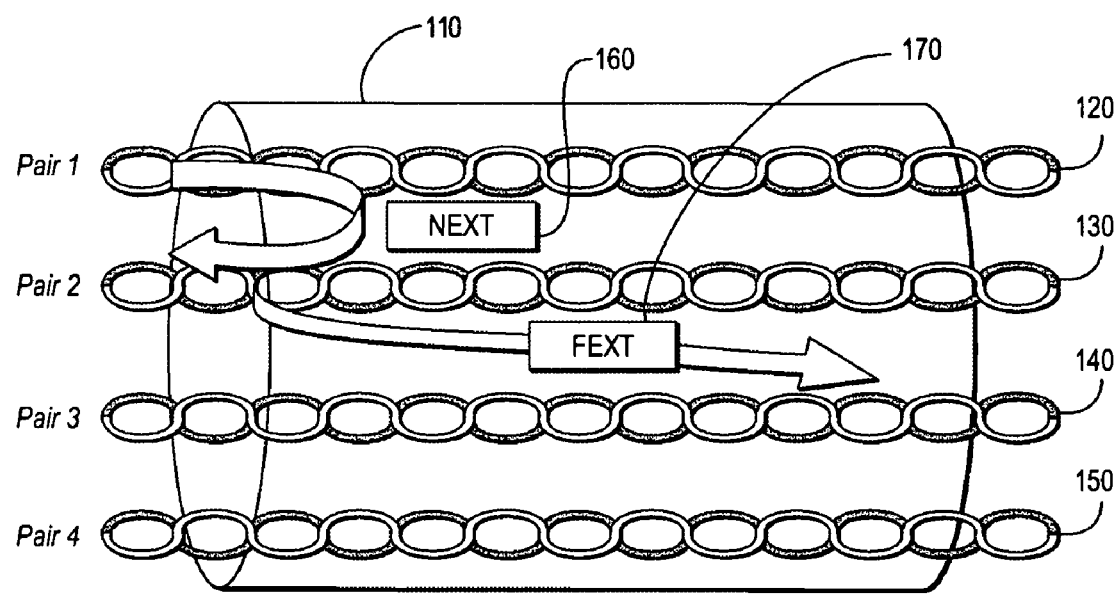
FIG. 1 illustrates NEXT and FEXT crosstalk interference in a copper binder group in one prior-art embodiment.

The present invention is described and illustrated in conjunction with systems, apparatuses and methods of varying scope. In addition to the aspects of the present invention described in this summary, further aspects of the invention will become apparent by reference to the drawings and by reading the detailed description that follows.

Numerous theoretical studies and lab tests have demonstrated the performance benefits of MIMO technologies applied to physical layer bonding in copper access networks. Those benefits are present in point-to-point and point-to-multipoint applications but they introduce novel deployment challenges for the network operators. In particular, the initial deployment period, where the novel technology will be present only in a very small percentage of the total lines in the network deserves careful consideration. The successful introduction of new multipair technologies is dependent upon deployment practices that will safeguard the improved performance of systems during this transition period. The difficulties and potential solutions for the incremental introduction of MIMO technologies into the network are described below.

A method and apparatus for deploying new technology such as MIMO transmission technology in a geographically distributed network such as a telecommunications network is provided. In one embodiment, the invention is a method of installing new technology in an existing geographically distributed network. The method includes dedicating network resources of the geographically distributed network for the new technology to produce dedicated network resources of the geographically distributed network. The method also includes installing a component for the new technology at a centralized network facility of the geographically distributed network. Moreover, the method includes coupling the dedicated network resources of the geographically distributed network to the component. The method may further include installing subscriber equipment at subscriber sites. The new technology may be MIMO transmission technology.

In another embodiment, the invention is a telecommunications system. The system includes a set of distributed twisted pair copper lines. The system further includes a first set of binders, with each binder of the first set of binders including a plurality of twisted pair copper lines. The system also includes a first interconnect. The first interconnect has a set of couplings. Twisted pairs of copper lines of the set of distributed twisted pair copper lines are coupled to couplings of the set of couplings of the first interconnect. Twisted pairs of the binders of the first set of binders are also coupled to couplings of the set of couplings of the first interconnect. Additionally, the system includes a second interconnect, the second interconnect having a set of couplings. Twisted pairs of the binders of the first set of binders are coupled to couplings of the set of couplings of the second interconnect. Telecommunications equipment is coupled to the couplings of the set of couplings of the second interconnect. Moreover, the system includes a second set of one or more binders, each binder of the second set of binders including a plurality of twisted pair copper lines. Each binder of the second set of binders is dedicated to a predetermined application. Twisted pairs of the binders of the second set of binders are coupled to couplings of the set of couplings of the first interconnect. Twisted pairs of the binders of the second set of binders are coupled to dedicated couplings of the set of couplings of the second interconnect. The dedicated couplings of the set of couplings of the second interconnect are coupled to equipment for the predetermined application.

In yet another embodiment, the invention is a method of installing new technology at a central office in an existing geographically distributed network. The method includes dedicating network resources of the geographically distributed network for the new technology to produce dedicated network resources of the geographically distributed network. The dedicated network resources include a dedicated portion of a previously existing interconnect at the central office and a set of binders, each binder including a plurality of twisted pairs of copper wire. Each binder of the set of binders is suitable to be coupled to the interconnect. The method also includes installing a component for the new technology at a centralized network facility of the geographically distributed network. The method further includes coupling the dedicated network resources of the geographically distributed network to the component.

In still another embodiment, the invention is a telecommunications system. The system includes a first set of binders, each binder of the first set of binders includes a plurality of twisted pair copper lines. The system further includes an interconnect, the interconnect having a set of couplings. The twisted pairs of the binders of the first set of binders are coupled to couplings of the set of couplings of the interconnect. The telecommunications equipment is coupled to the couplings of the set of couplings of the interconnect. Also, the system includes a second set of one or more binders, each binder of the second set of binders including a plurality of twisted pair copper lines. Each binder of the second set of binders is dedicated to a predetermined application. Twisted pairs of the binders of the second set of binders are coupled to dedicated couplings of the set of couplings of the interconnect. The dedicated couplings of the set of couplings of the interconnect are coupled to equipment for the predetermined application.

In yet another embodiment, the invention is a telecommunications system. The system includes a set of distributed twisted pair copper lines. The system further includes an interconnect, the interconnect having a set of couplings. Twisted pairs of copper lines of the set of distributed twisted pair copper lines are coupled to couplings of the set of couplings. The system also includes a first set of binders. Each binder of the first set of binders includes a plurality of twisted pair copper lines. Twisted pairs of the binders of the first set of binders are coupled to couplings of the set of couplings. Moreover, the system includes a second set of one or more binders. Each binder of the second set of binders includes a plurality of twisted pair copper lines. Each binder of the second set of binders is dedicated to a predetermined application. Twisted pairs of the binders of the second set of binders are coupled to couplings of the set of couplings.

In still another embodiment, the invention is a method of installing new technology in an existing geographically distributed network. The method includes receiving a request for new technology for the geographically distributed network. The method also includes installing a component for the new technology at a centralized network facility of the geographically distributed network. The method further includes coupling dedicated network resources of the geographically distributed network to the component.

In another embodiment, the invention is a method of installing new technology at a local facility in an existing geographically distributed network. The method includes dedicating network resources of the geographically distributed network for the new technology to produce dedicated network resources of the geographically distributed network. The dedicated network resources include a set of binders, each binder including a plurality of twisted pairs of copper wire. The method also includes coupling a subset of the dedicated network resources to an interconnect of the local facility.

In yet another embodiment, the invention is a method of installing MIMO technology in an existing geographically distributed network. The method includes dedicating network resources of the geographically distributed network for the MIMO technology to produce dedicated network resources of the geographically distributed network. The method further includes installing a MIMO transceiver for the new technology at a centralized network facility of the geographically distributed network. The method also includes coupling the dedicated network resources of the geographically distributed network to the MIMO transceiver.

In still another embodiment, the invention is a method of installing MIMO technology at a central office in an existing geographically distributed network. The method includes dedicating network resources of the geographically distributed network for the MIMO technology to produce dedicated network resources of the geographically distributed network. The dedicated network resources include a dedicated portion of a previously existing interconnect at the central office. The dedicated network resources also include a set of binders. Each binder includes a plurality of twisted pairs of copper wire, and each binder of the set of binders is suitable to be coupled to the interconnect. The method also includes installing a MIMO transceiver for the new technology at the central office. The method further includes coupling the dedicated network resources of the geographically distributed network to the MIMO transceiver.

In another embodiment, the invention is a method of installing MIMO technology at a local facility in an existing geographically distributed network. The method includes dedicating network resources of the geographically distributed network for the new technology to produce dedicated network resources of the geographically distributed network. The method further includes coupling a subset of the dedicated network resources to an interconnect of the local facility.

In yet another embodiment, the invention is a telecommunications system. The system includes a means for distributing signals to subscribers. The system also includes a first means for distributing sets of signals within a telecommunications network. The system further includes a means for bridging between the means for distributing signals and the first means for distributing sets of signals. Also, the system includes a means for bridging to the first means for distributing sets of signals. Moreover, the system includes a second means for distributing sets of signals within a telecommunications network. The second means is for distributing sets of signals dedicated to a new technology. The means for bridging to the first means for distributing sets of signals is also for bridging to the second means for distributing sets of signals. The means for bridging between the means for distributing and the first means for distributing sets of signals is also for bridging between the means for distributing and the second means for distributing sets of signals.

In still another embodiment, the invention is a method of installing MIMO technology in an existing geographically distributed network. The method includes first, dedicating network resources of the geographically distributed network for the MIMO technology to produce dedicated network resources of the geographically distributed network. Next, the method includes second, installing a MIMO transceiver for the new technology at a centralized network facility of the geographically distributed network. Then, the method includes third, coupling the dedicated network resources of the geographically distributed network to the MIMO transceiver.

It may be useful to briefly review the features and flavors of MIMO systems and then examine the relevant aspects of the outside plant that affect MIMO deployments. In describing the present invention, potential obstacles are identified and solutions proposed for introducing the new technologies in a manner that is friendly to the network and safeguards the anticipated performance benefits.

Point to Point Multipair System MIMO Transceivers

MIMO systems appropriately process the transmitted and/or received signals across pairs to precisely counteract the coupling effects of the multichannel medium. They are further able to match the transmission to the spectral profile of the interference as it appears across pairs and thus mitigate the effects of alien crosstalk. These benefits can be achieved through a variety of MIMO architectures. Some designs involve receiver-only processing, some use pre-processing at the transmitter (before the signals are sent out on the channel), and some use both.

Figure 2:
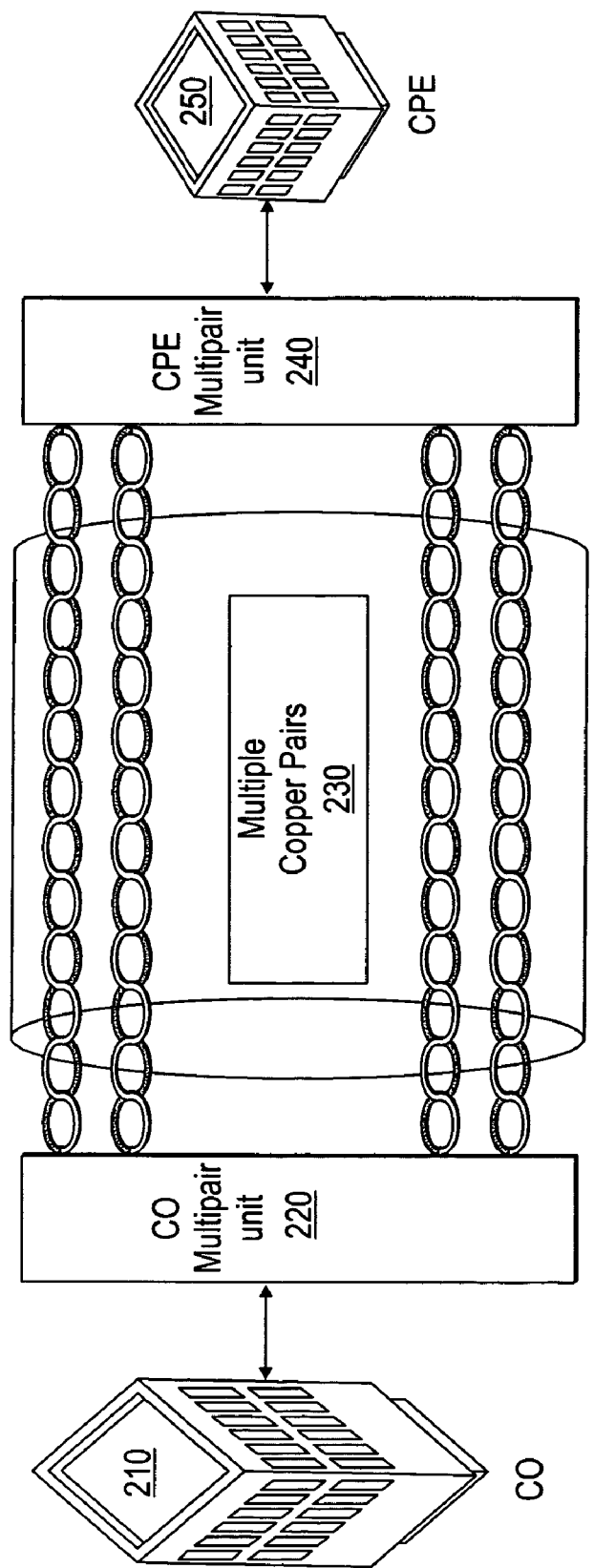
FIG. 2 illustrates an embodiment of point to point multipair system MIMO transceivers.

A simple implementation of a MIMO system being deployed is in a point-to-point configuration as shown in FIG. 2. A multipair MIMO transceiver is placed at each end of the copper cable (CO and CPE side) and a high speed link is established utilizing multiple copper pairs. This embodiment may be suitable for services that require data rates well in excess of what a single pair can support and therefore call for some kind of copper pair "bonding" to be employed.

More particularly, FIG. 2 illustrates an embodiment of a point to point multipair MIMO system, such as may be implemented in a geographically distributed network. A telecommunications network, utilizing copper twisted pairs, is one example of an embodiment of such a network. Central office 210 includes a central office multipair unit 220, which is a dedicated MIMO data transceiver. Connected or coupled to MIMO transceiver 220 are the copper twisted pairs of binder 230. On the CPE side, the copper twisted pairs of binder 230 are coupled to another MIMO transceiver 240 (a CPE side unit). MIMO transceiver 240 is then coupled to other equipment at CPE 250, allowing for use of the transmitted data.

Note that MIMO transceiver 240 may be nearly identical to MIMO transceiver 220, or differences may be included depending on details of the embodiment or implementation in question. However, MIMO transceiver 220 and MIMO transceiver 240 may be expected to implement transmission of data over the copper twisted pairs using a MIMO process, thereby reducing noise in the transmission. Moreover, note that the copper twisted pairs are illustrated in a single binder, but the overriding feature of this embodiment is that all of the copper twisted pairs originate at central office 210 and terminate at CPE 250.

Point to Multipoint System

The configuration of FIG. 2 is flexible in terms of implementation of the MIMO scheme. Both one-sided and two-sided architectures are applicable. Unfortunately however, in order for the MIMO benefits to become significant in that embodiment, several copper pairs have to be bonded in that fashion. MIMO processing exploits the signal interdependencies across lines. Hence one should not expect any improvement if applied to a single line. Similarly, only small improvements should be expected in many important cases of interest where only two or three lines are available or necessary for bonding.

Figure 3:
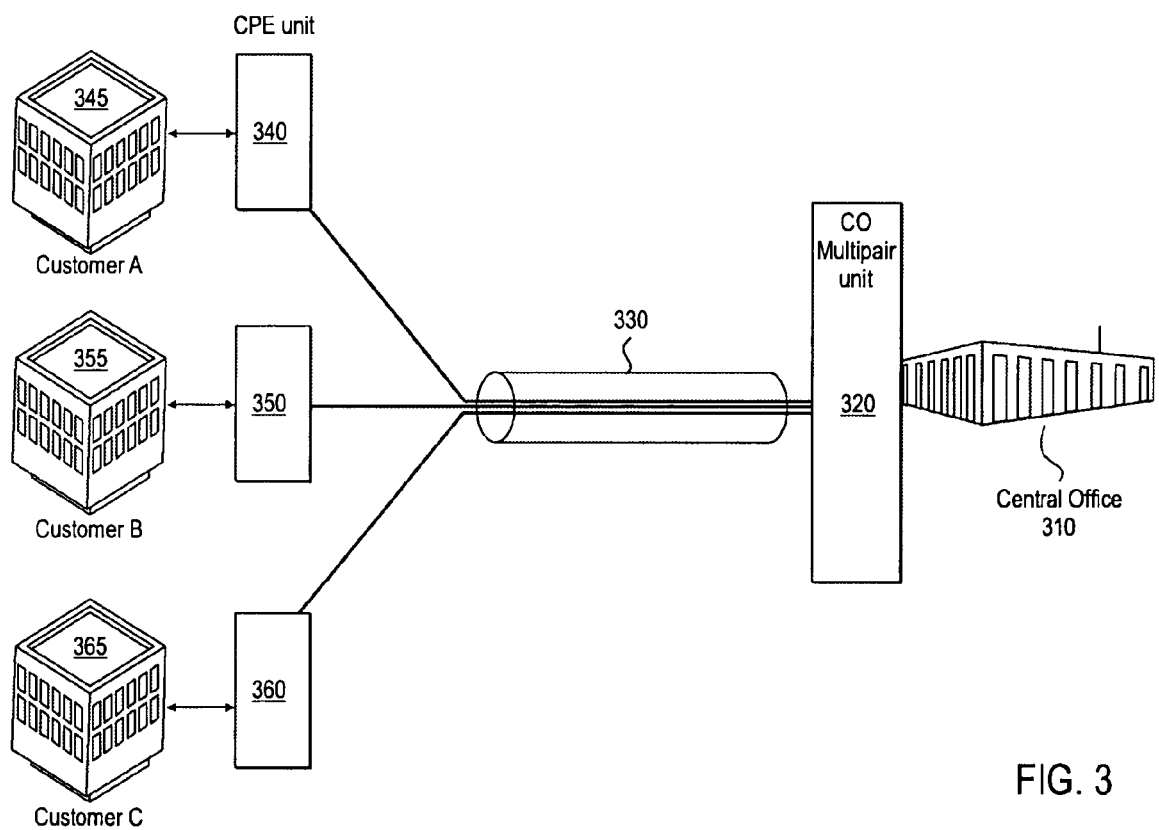
FIG. 3 illustrates an embodiment of a point to multipoint system.

For these reasons, the point-to-multipoint architectures depicted in FIG. 3 are interesting. In this embodiment, a multipair transceiver positioned at the CO is connected to multiple CPE transceivers. The transceivers may also have multiple pairs, or they may even be single pair transceivers. This embodiment allows only one sided MIMO architectures to be implemented (residing at the CO). On the other hand, this embodiment can bring the performance benefits of MIMO processing even to services that only use one, two or three pairs. Further, they are able to contain the MIMO complexity (and cost) only on the CO side, without requiring MIMO processing at the CPE.

With particular reference to FIG. 3, a point to multipoint embodiment is illustrated. The embodiment uses MIMO architectures to improve transmission, without requiring that each recipient receive multiple lines. The central office (310) includes a MIMO transceiver unit (320) which handles MIMO encoding/decoding. Coupled to the MIMO transceiver 320 are the lines (copper twisted pairs) of binder 330. Coupled to the lines of binder 330 at the subscriber side are CPE transceivers 340, 350, and 360, each of which handle transmission and reception at the customer side.

Thus, customer site 345 uses transceiver 340 to communicate along its subscriber line(s) (of the binder 330). Similarly, customer site 355 uses transceiver 350 to communicate along its subscriber line(s) and customer site 365 uses transceiver 360 to communicate along its subscriber line(s). In one embodiment, customer 345 has a single line, customer 355 has three lines, customer 365 has two lines, and the collective group of six lines are MIMO encoded for transmission, thereby reducing or eliminating noise on all six lines, without requiring a large number of lines at one customer site. Moreover, note that transceivers 340, 350 and 360 may be MIMO transceivers or more traditional transceivers in various embodiments, depending on whether a single-ended or double-ended approach to MIMO is implemented.

Note that subscriber sites do not need information about other subscriber sites in some embodiments. For example, a single-ended MIMO solution wherein MIMO technology is used only at the CPE location would not need subscriber sites with information about other sites. Moreover, as illustrated and referred to with respect to FIG. 3, a subscriber may receive a single line (twisted pair), multiple lines, up to and including one or more full physical binders of connections. The number of lines to a single subscriber are not necessarily a parameter which allows for or prohibits MIMO installation.

Additionally, binders may be physical binders, or may relate to a physical or logical grouping of lines. Thus, a binder may represent an actual physical binder which includes a plurality of physical lines. Alternatively, a binder may logically represent a plurality of subscriber or other physical lines in close proximity. Similarly, a binder may represent a plurality of physical lines which tend to exhibit some form of cross-coupling. Either physical proximity or some form of cross-coupling should be present in the plurality of lines referred to as part of a binder.

MIMO solutions similar to FIG. 3 are straightforward to implement in greenfield applications or forklift upgrades. For example, they may be suitable for campus applications, for in-building distribution or for VDSL deployments. For the vast majority of copper access applications however, one should examine how the new links supported by the MIMO equipment can be brought up incrementally (one customer at a time) and in the presence of legacy services in the binder. To understand the associated deployment issues, one should consider the general structure of the outside plant and the way services are typically provisioned.

Figure 4:
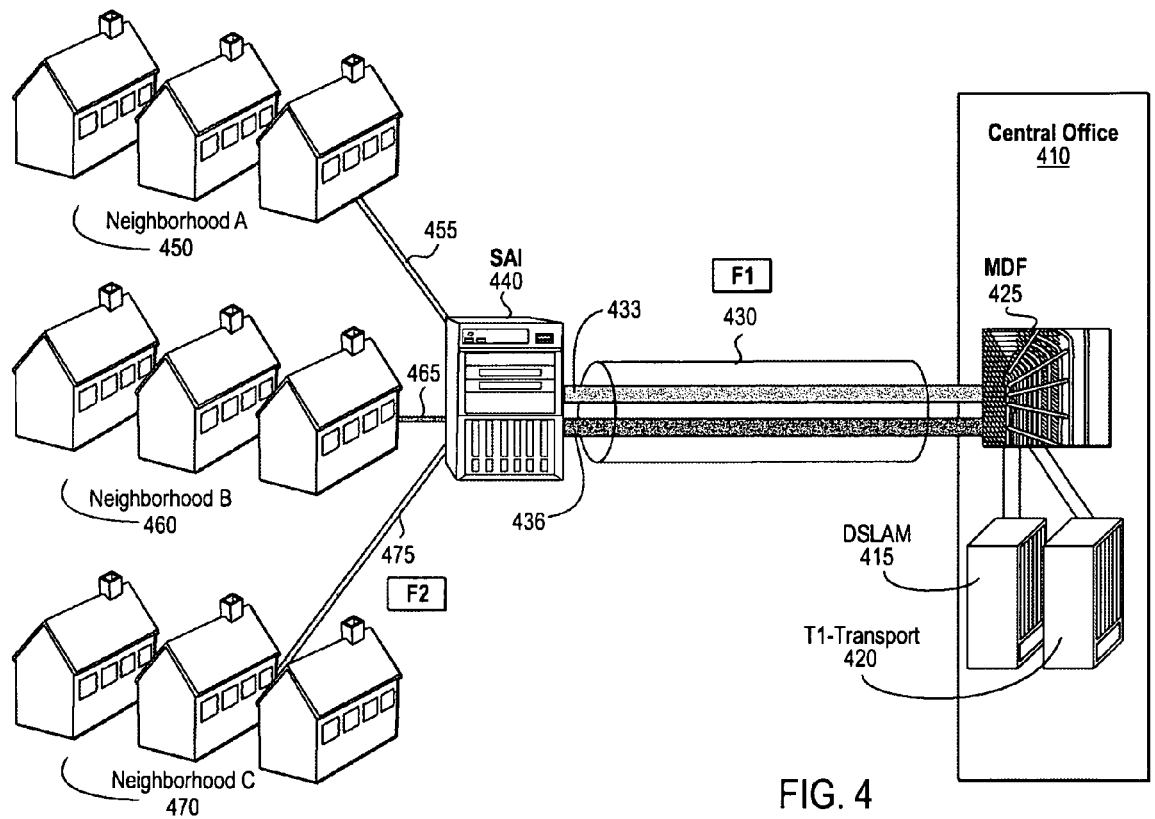
FIG. 4 illustrates an embodiment of a copper access network.

The Structure of the Outside Plant and Configuration of the Copper Access Network The features of the outside plant that are relevant are depicted in FIG. 4. In principle, the outside plant is a collection of copper pairs connecting each customer to the closest CO. Those pairs are aggregated into binder groups and stay in close proximity for the majority of the loop length. This physical proximity is typically responsible for the crosstalk interactions among pairs.

For reasons of ease of maintenance, the loop plant has several crossconnect or interconnect boxes at key junction points. Inside the CO, the Main Distribution Frame (MDF) crossconnect is used to connect a particular equipment port to a desired outside loop. The loops are organized into feeder cables in the F1 part of the plant, and into smaller distribution cables once they reach the target neighborhood they service (F2 part of the plant). The F1 and F2 plants meet at a crossconnect called the Service Area Interface (SAI).

In order to provide a service to a customer, a pair from the customer premises to the SAI (distribution plant) and a pair from the SAI to the MDF (feeder plant) have to be identified and coupled at the SAI. The two pairs are coupled through the crossconnect or interconnect of the SAI. Then, back at the CO, a port from the appropriate equipment has to be connected to that loop at the MDF. In FIG. 4, different binders in the feeder plant are shown. Examples are also shown where one customer in one neighborhood is serviced by a pair connected to one binder, while another two customers from two different neighborhoods are serviced by pairs connected to another binder.

Referring specifically to FIG. 4, an embodiment of the copper access network is illustrated. Central office 410 includes an interconnect 425 (MDF), a DSLAM or DSL component (415) and a T1 transport (420). The DSLAM 415 and T1 transport 420 are both coupled to the interconnect 425. Also coupled to the interconnect are a set of binders 430, including binder 433 and binder 436. The set of binders 430 are also coupled to a local distribution facility 440, which includes a local interconnect (not shown). Local distribution facility 440 is coupled by cables of copper twisted pairs 455, 465 and 475 to locations 450, 460 and 470 respectively. Moreover, each of binders 433 and 436 are coupled to individual locations through the interconnect of local distribution facility 440. Each binder of set of binders 430, including binder 433 and binder 436, includes a set of copper twisted pairs.

Thus, the telecommunications network couples centralized equipment such as DSLAM 415 or T1 transport 420 through a first interconnect (such as 425 for example), a binder (such as 433 for example), a second interconnect (such as one in local facility 440 for example), and a local copper twisted pair (such as one included in 455 for example) to a subscriber location (such as a house in location 450 for example). The subscriber location may have individual subscriber equipment or may utilize specific subscriber equipment for the technology in use over the telecommunications network.

Note that interconnects may be implemented in various ways. A first and a second interconnect may be located in the same building or geographically separated. Moreover, separate interconnects within a building may be cascaded while either constituting a first interconnect, or first and second interconnects. The first interconnect may thus have separate constituent interconnects, which appear as a single interconnect from the vantage point of a second interconnect. Alternatively, a second interconnect may effectively be cascaded from a first interconnect within a building, with the links to the second interconnect going to relatively local distribution or endpoints for example. Similarly, cascading of interconnects may occur in a geographically separated manner, such that several interconnects may be grouped into a first and second interconnect, or may involve first, second, third and more interconnects for example.

Deployment of MIMO Supported Services

Given this structure of the outside plant and the way new connections are provided one may examine how MIMO equipment and associated services may be deployed. One might question why MIMO equipment would be any different from other equipment as far as deployment is concerned and why this exercise is needed. However, the special requirements that MIMO technologies need to maintain their performance benefits provide for some differences.

MIMO technologies capitalize upon the interactions of the signals across pairs to process and clean those pairs of interference. In order to achieve this, the following conditions are useful in the point-to-multipoint configuration:

The CO MIMO transceiver should be connected to several (more than one) pairs.

Those pairs should be in the same binder (so there is coupling among pairs), or otherwise coupled.

Those conditions lead to special considerations for the associated deployment process. For example, one should take care to ensure that the first customer that is connected to one port of the CO MIMO transceiver still enjoys the MIMO benefits despite the fact that there is no other MIMO line in use.

Deployment of New Multipair Service (No Binder Separation)

Figure 5:
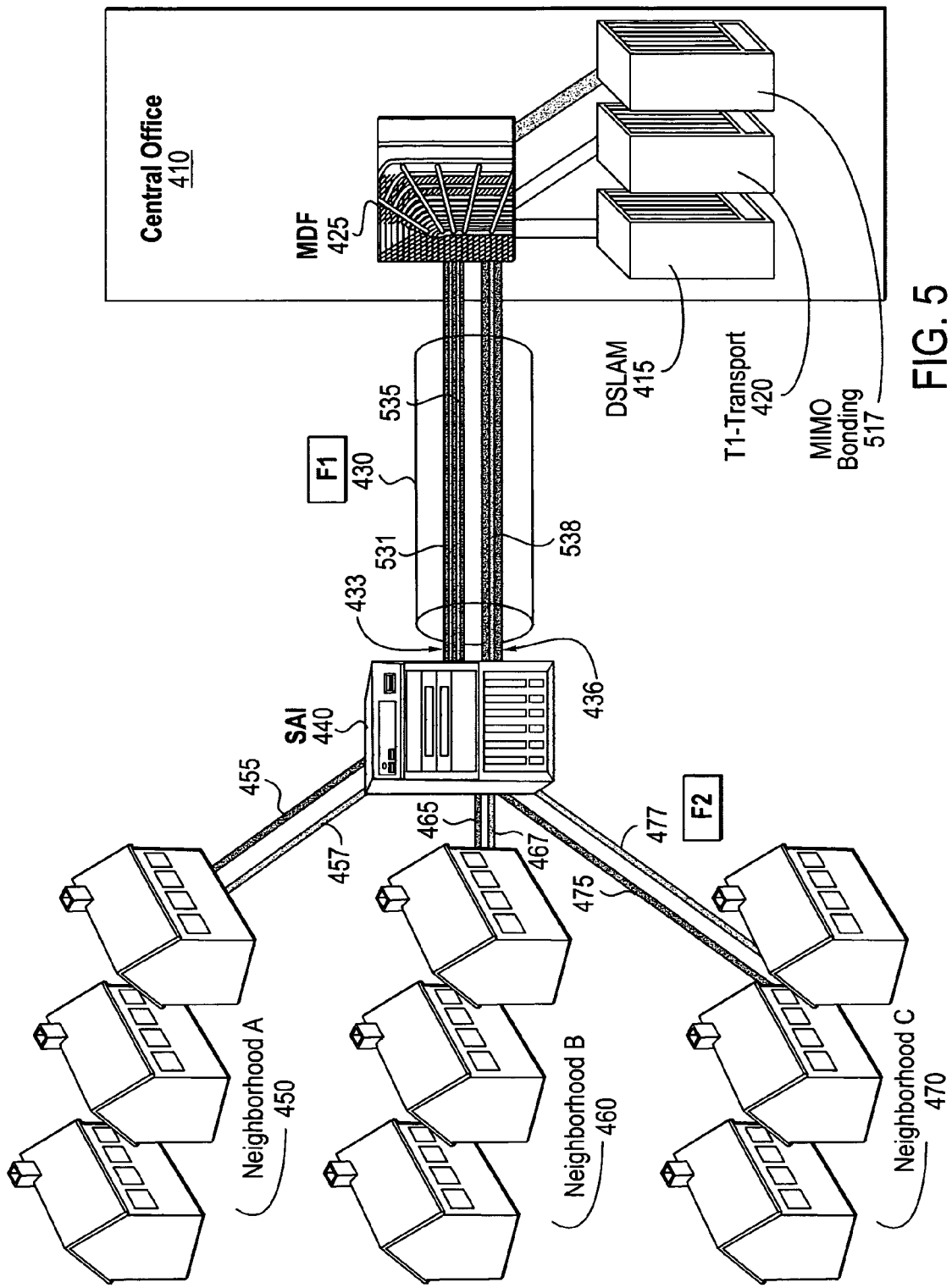
FIG. 5 illustrates an embodiment of a new multipair service without binder separation.

FIG. 5 generally illustrates deploying a new service (in this case a MIMO multipair bonding service). The new equipment is installed at the CO with a cable connecting it to the MDF. As new customer orders come in, each customer's or subscriber's loop is coupled to a MIMO port by an appropriate coupling at the MDF.

Unfortunately, this process operates on a first-come-first-served basis and provides no guarantee that all ports from a MIMO transceiver will be associated with loops that belong in the same binder group. As an example, FIG. 5 illustrates an embodiment where the three first customers (from three different neighborhoods) are coupled to the MDF (and eventually to the MIMO transceiver) through various different binder groups in the F1 part of the plant. The implication of this deployment is that those customers will not benefit from the performance improvements promised by the new technology until some future point when a large percentage of customers in all F1 binders will have converted to the new technology.

An embodiment of a new multipair service without binder separation is illustrated in FIG. 5. MIMO transceiver component 517 is added in at central office 410, and is coupled to a dedicated portion of interconnect 425. As a result, copper twisted pairs from set of binders 430 may be coupled to MIMO transceiver 517 through interconnect 425. In particular, copper twisted pairs 531 and 535 of binder 433 are coupled through interconnect 425 to MIMO transceiver 517, and copper twisted pair 538 of binder 436 is also coupled through interconnect 425 to MIMO transceiver 517. Moreover, pair 538 is coupled through the interconnect of local facility 440 to copper twisted pair 577 to a subscriber in location 470. Similarly, pair 531 is coupled through the interconnect of local facility 440 to copper twisted pair 557 to a subscriber in location 450 and pair 535 is coupled through the interconnect of local facility 440 to copper twisted pair 567 to a subscriber in location 460. At this point, subscribers of locations 450, 460 and 470 have MIMO technology available for their telecommunications activities. Unfortunately, MIMO is most effective for channels which are likely to exhibit crosstalk with other channels in the same MIMO system. In this example, two pairs (531 and 535) are in the same binder (433), and may have some crosstalk between them, but they are unlikely to have any crosstalk with pair 538 in another binder (436). Thus, the subscribers are unlikely to reap much, if any, benefit, until other subscribers start using MIMO technology.

Thus, it appears that this technology faces a peculiar barrier to entry. While higher performance for everybody is feasible once many users adopt the new technology, this performance does not materialize for the first few users of the technology. Therefore, there is no incentive for an incremental adoption of the new technology and no path for network evolution into the new technology. This problem can be solved, and the barrier to entry reduced, with carefully planned provisioning and deployment of the service for the first few users.

Preferably, the process for deployment involves planning ahead of time, and careful utilization of resources during incremental deployment to subscribers. In particular, equipment for the new technology may be installed initially at a central office, and network resources may be dedicated then or soon thereafter to the new technology on a bulk basis. Then, as subscribers start requesting and utilizing the new technology, the previously dedicated network resources may be used in fulfilling subscriber requests. Since the network resources were previously dedicated, each subscriber gets significant benefits from the new technology, with some incremental improvements for later subscribers, instead of slight (or non-existent) benefits for initial subscribers and significant incremental improvements for later subscribers.

Note that requests may come in different forms within the scope of the present invention. For example, a request may be generated from within a company or other entity to initially provide MIMO technology, consistent with long-term planning. Such a request may not relate to a specific subscriber request, and may be consistent with long-term planning for a resource which may eventually be offered to subscribers.

Alternatively, requests may come from subscribers for actual MIMO technology or other resources which are difficult to deploy in existing networks. With previously dedicated resources, ongoing planning for the new technology may occur in terms of long-term dedication of resources rather than short-term scrambling for resources. Thus, subscriber requests may be accomodated or fulfilled in part as a result of earlier requests to provide MIMO technology.

Methods of Deployment Using Dedicated Resources

Figure 6:
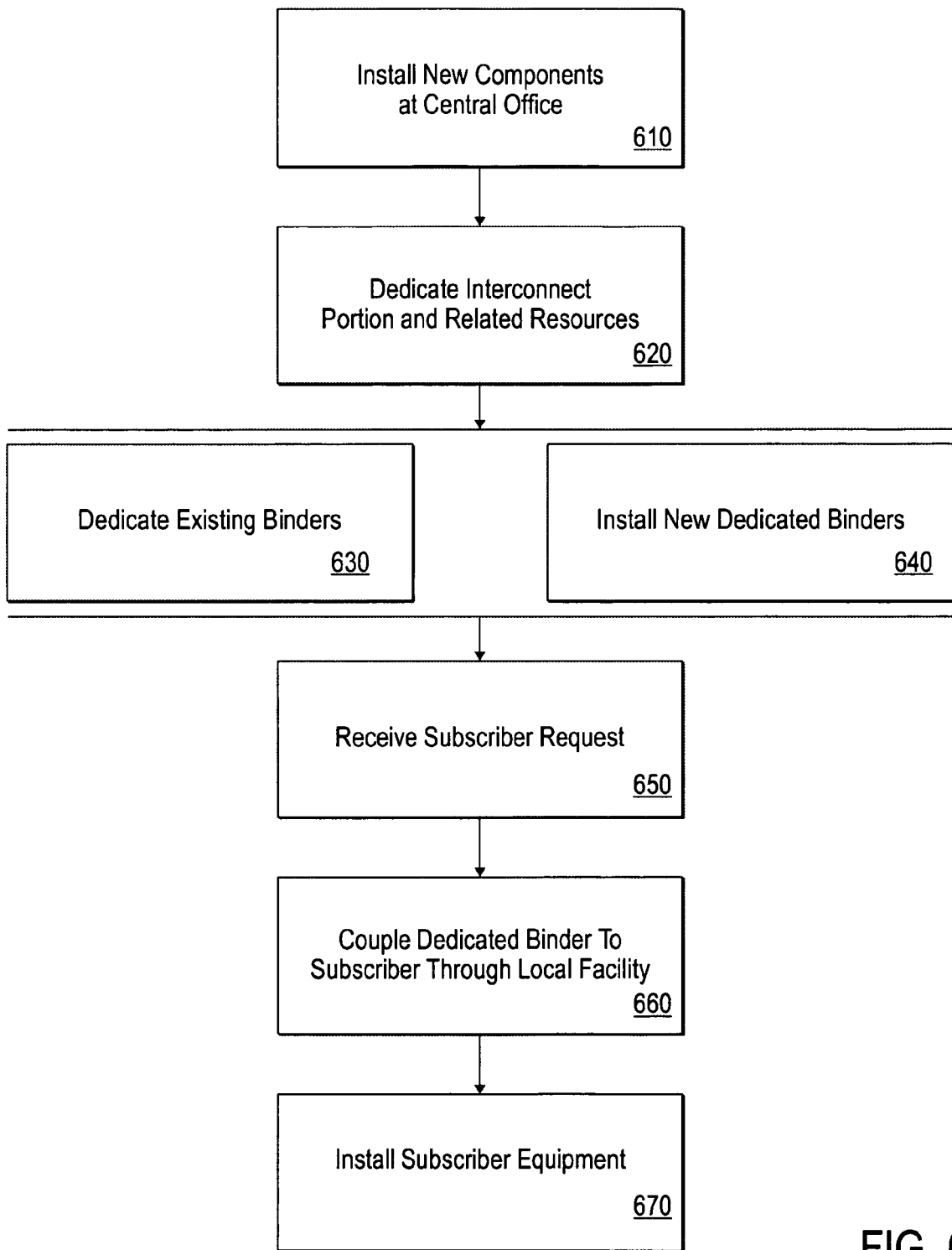
FIG. 6 illustrates an embodiment of a method of installing a new technology.

Turning to an embodiment of an overall process for adding a new technology, reference is directed to FIG. 6. At module 610, the new component or components are installed at the central office or similar central facility for the geographically distributed network. Note that the central facility may be central to a given area, such as central offices in telecommunications networks, or may be more truly central to a smaller network for example. At module 620, a portion of an interconnect or related resources of the geographically distributed network at the central facility is dedicated to the new technology. Preferably, the dedicated portion is drawn from expansion reserves of the resources, rather than resources currently in use, thus reducing or eliminating the need to reconfigure the network.

At module 630, existing binders of a network, or similar resources, are dedicated to use with the new technology. Again, preferably the existing binders were reserved for expansion rather than currently in use. Moreover, note that binders are an example of signal transmission equipment, wires, or other components, and thus are not the only type of transmission resources suitable for dedication to a new technology. Alternately, new dedicated binders may need to be installed at module 640, such as in a situation or embodiment where essentially all currently existing network resources are already in use for example. Installation of new dedicated binders may occur in conjunction with installation of new binders in general, as may be expected to happen from time to time as capacity in existing networks is increased. Additionally, modules 630 and 640 may be employed in parallel on in series in various embodiments of the process, depending on the unique needs and status of the networks in question.

At module 650, a subscriber requests the new technology. The subscriber may either be a current subscriber, or a new subscriber with either existing or expected service from the previously existing geographically distributed network. Thus, in some embodiments, the subscriber may be at a building with existing phone service, at a building without existing phone service, or at a proposed building for which phone service must be provided for example. At module 660, the dedicated binder or other dedicated resources are coupled to the subscriber through the local facility and any local twisted pair or other subscriber-specific network resources. At module 670, any subscriber equipment may be installed, such as a specialized modem for example.

Figure 7A:
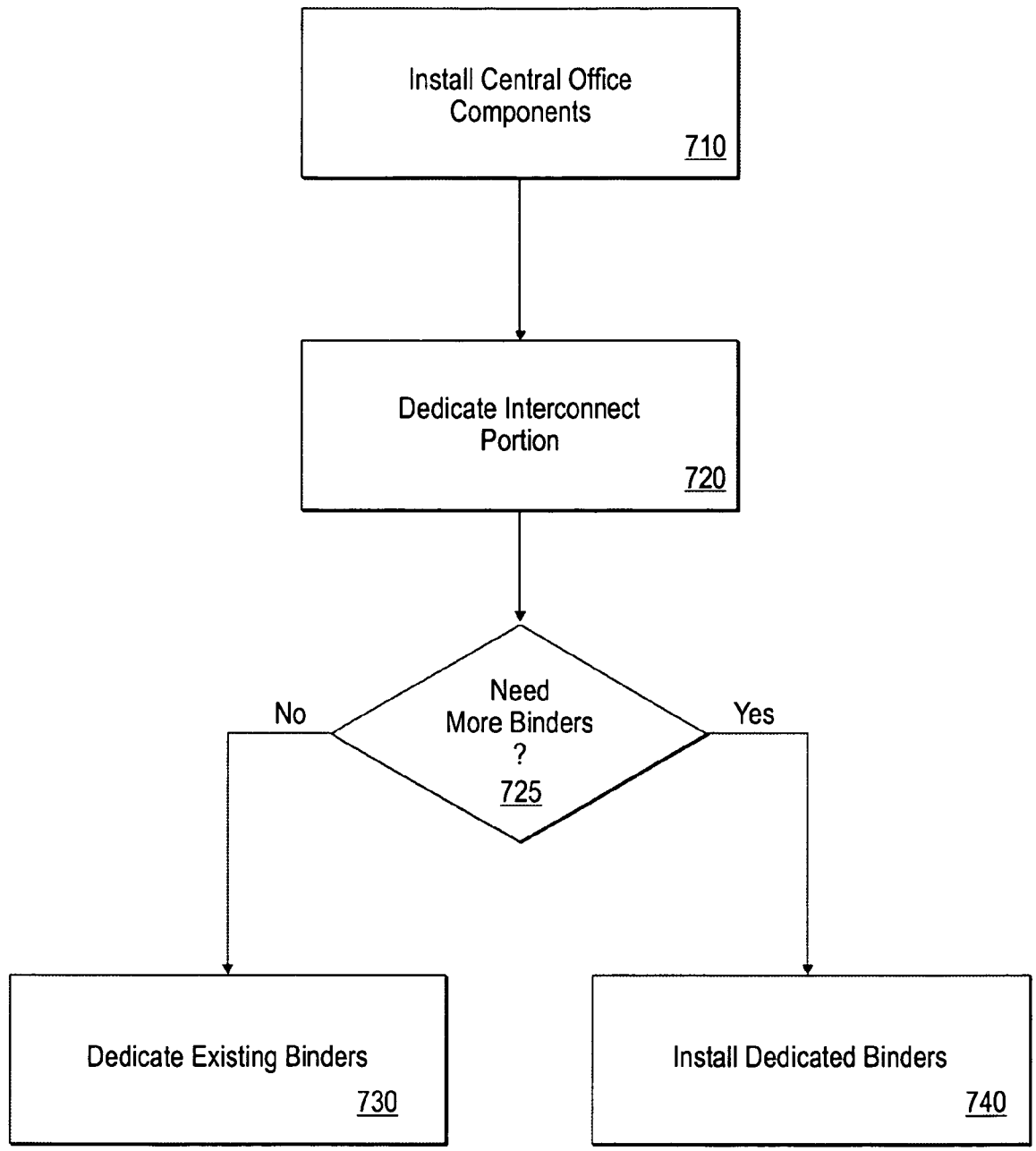
FIG. 7A illustrates an embodiment of a method of installing a new technology at a central location.

In some embodiments, two separate processes may occur, one at the central office or other centralized facility of a network and another at the local area for a given subscriber. Referring to FIG. 7A, an embodiment of a process of deploying new technology at a central office is illustrated. In module 710, components, hardware and the like are installed at the central office or other centralized facility, such as installation of a MIMO transceiver. In module 720, a portion of the interconnect or other network resources at the central office are dedicated to use with the new technology, and may be immediately coupled to or connected to the newly installed components.

In module 725, a determination is made as to whether more binders or other network resources are needed. If not, in module 730, existing binders or other relevant network resources are dedicated to use with the new technology, and these binders may be coupled to the newly installed components through the dedicated portion of the interconnect of module 720 for example. Note that coupling to the newly installed components may be reserved until a later time, and may be done on an as-needed basis if appropriate. In the case of MIMO technology, coupling at the time of dedication may be preferable, as the multiple channels of the multiple-input-multiple-output process would then be known. Note that reservations may occur in terms of binders, portions of binders, or individual couplings or lines. If new binders or other network resources are needed, in module 740 the dedicated binders or network resources are installed. This may occur as part of ongoing upgrades to a network or as a specific addition to the network for the installation/deployment of the new technology. To ease deployment costs, it may be preferable to plan for installation of new binders as part of other ongoing upgrades to the system.

Figure 7B:
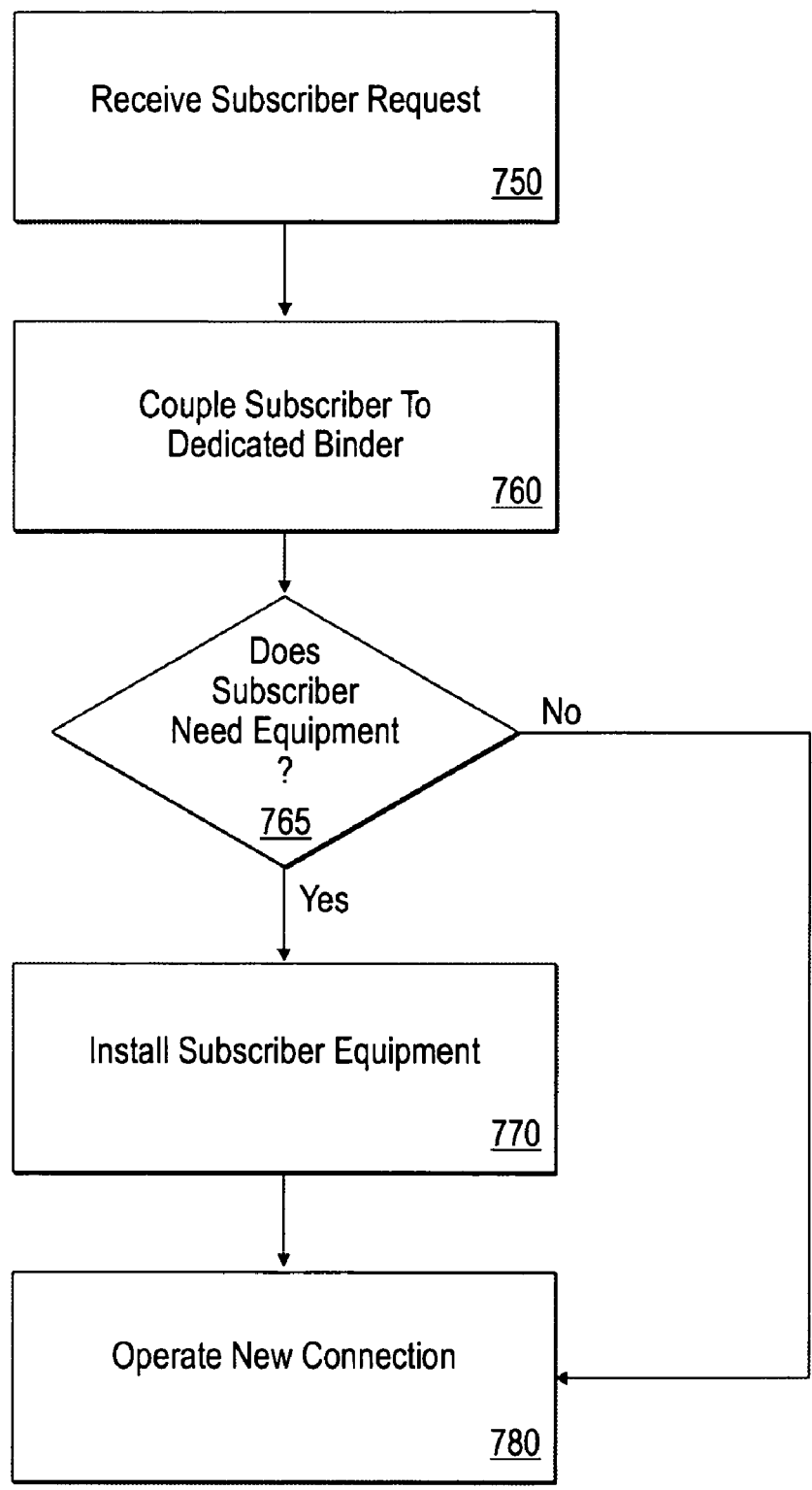
FIG. 7B illustrates an embodiment of a method of installing a new technology at a local facility and subscriber location.

Referring now to FIG. 7B, an embodiment of a process of deploying new technology to a subscriber is illustrated. In module 750, a subscriber request is received, indicating the subscriber wants to take advantage of the new technology in question. In module 760, the subscriber location is coupled to a dedicated binder to similar dedicated network resource. This may include, for example, identifying a subscriber twisted pair, coupling that subscriber twisted pair to a local interconnect, and coupling the local interconnect to an unused dedicated binder twisted pair. In module 765, a determination is made as to whether the subscriber needs special equipment (such as a subscriber MIMO transceiver for example) at the subscriber location to take advantage of the new technology. If so, in module 770, the subscriber equipment is installed. If not (special equipment is not necessary) or after installation, in module 780, the connection may be operated. Note that the subscriber twisted pair mentioned is likely to already be present, in which case the method will not require new resources to be laid down between a local facility and the subscriber site in most instances.

Deployment Example of New Multipair Service (with Binder Separation)

Figure 8:
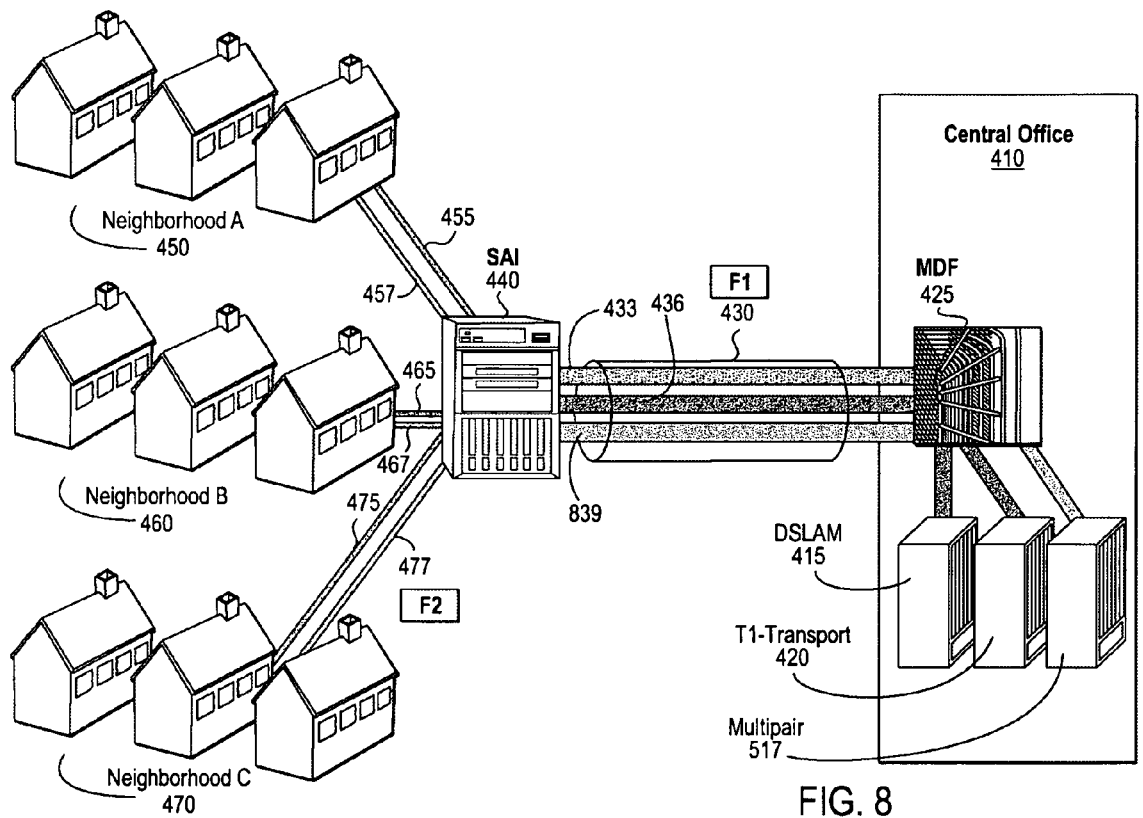
FIG. 8 illustrates an embodiment of a new multipair service using binder separation.

FIG. 8 illustrates a different deployment that provides performance improvements even for the very first user of the new technology. As expected, the MIMO equipment is installed at the CO and connected or coupled to the MDF as before. In addition, a binder in the F1 plant is isolated and a large percentage of it or all of it is dedicated to the MIMO ports. For example, one may couple 12 pairs from this binder to 12 ports of the MIMO system although there is no user (and no CPE device) on the system yet. All MIMO lines are thus in the same binder at the expense of occupying those pairs before the service is turned on.

As new customer orders come in, the customer loops are now coupled to the system at the SAI crossconnect and not at the MDF, using the dedicated binder. As an example, FIG. 8 illustrates this in one embodiment by showing three customers from three different neighborhoods being coupled to the system at the SAI and therefore maintaining their loops in the same F1 binder.

Turning specifically to FIG. 8, an embodiment of a point to multipoint deployment with dedicated binders is illustrated. Reference to FIG. 4 and FIG. 5 and accompanying text will explain most of the illustrated portions of FIG. 8. Notably, dedicated binder 839 is present within set of binders 430.

Dedicated binder 839 may either be a new binder or all or part of an existing binder. However, the dedicated twisted pairs of binder 839 are to be used only with MIMO transceiver 517, and are preferably all coupled through a dedicated portion of interconnect 425 to MIMO transceiver 517. One pair (a first pair) of binder 839 is coupled through a local interconnect of facility 440 to line 457, and thus to a subscriber location at location 450. Another pair (a second pair) of binder 839 is coupled through a local interconnect of facility 440 to line 467, and thereby to a subscriber location at location 460. Yet another pair (a third pair) of binder 839 is coupled through a local interconnect of facility 440 to line 477, and thus to a subscriber location at location 470. With the dedicated binder, the multiple channels of the MIMO transceiver are relatively constant from initial connection, such that much of the benefit of the MIMO technology is received by a first subscriber (such as a subscriber at location 450) regardless of whether other subscribers are present.

The advantage of the proposed deployment process is that the CO MIMO transceiver has access to all its lines from the beginning (from the time the first user comes into the system). In that way its MIMO processing capabilities can be put to use and the benefits derived even for the very first user. The drawback is that now a certain number of copper pairs have to be tied to this deployment prior to actually receiving customer orders. This is similar in nature to the investment one makes in equipment ports or other build-out prior to receiving customer orders.

Figure 9:
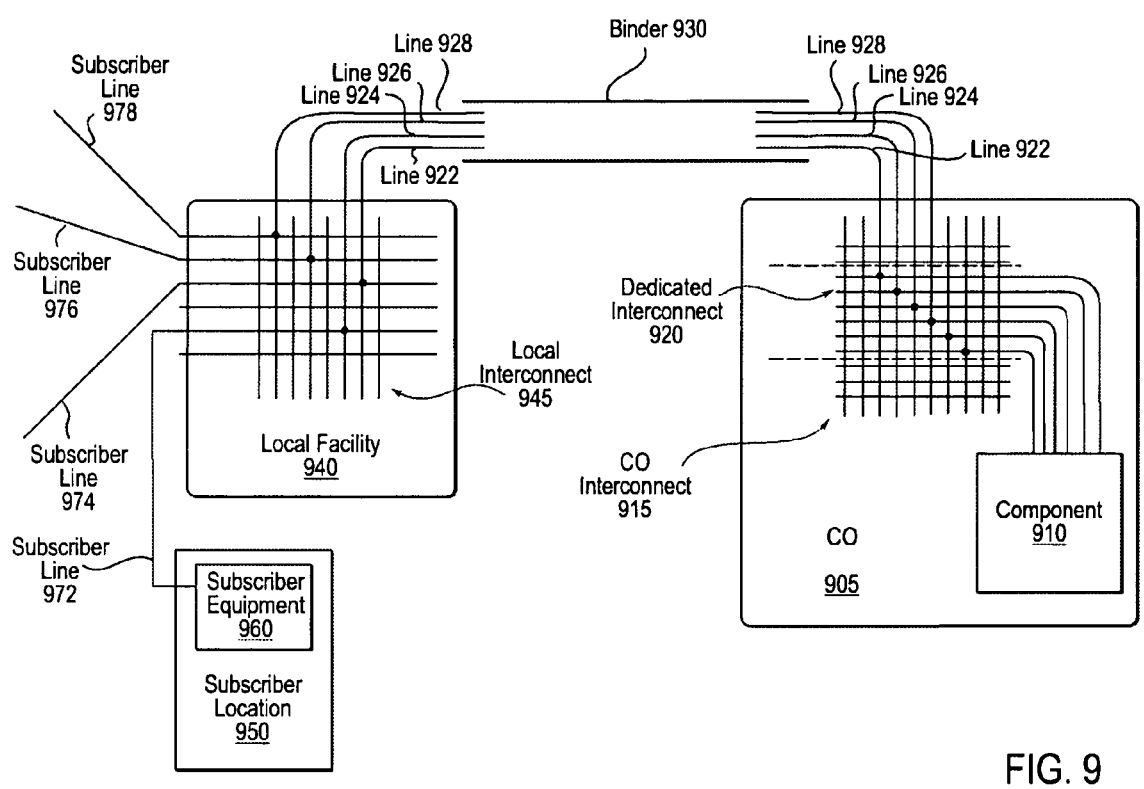
FIG. 9 illustrates an embodiment of a new technology deployed in a network.

Referring now to FIG. 9, an alternate embodiment of a point to multipoint deployment in a geographically distributed network is illustrated. Central office 905 includes central office interconnect 915. Deployed within central office 905 is also new component 910 (such as a MIMO transceiver). Coupled to component 910 is a dedicated interconnect portion 920 of interconnect 915. Coupled to dedicated interconnect portion 920 are lines 922, 924, 926 and 928 of binder 930. Thus, binder 930 may be considered a dedicated binder, even if it has additional lines which are not dedicated to use with component 910.

Lines 922, 924, 926 and 928 are also coupled to local interconnect 945 of local distribution facility 940. As illustrated, subscriber line 972 is coupled through interconnect 945 to line 924. Subscriber line 972 goes to subscriber location 950 and is coupled to subscriber equipment 960. Note that equipment 960 may be a dedicated or specialized component, such as a subscriber-end MIMO transceiver, or may be a more basic modem for example. Moreover, note that because lines 922, 924, 926 and 928 are all dedicated to use with component 910 and coupled to component 910, subscriber location 950 receives the advantages of MIMO transceiver 910, even though the other lines 922, 926 and 928 may not be in active use, or even coupled to other subscriber locations.

As illustrated, line 922 is coupled to subscriber line 974 through interconnect 945, line 926 is coupled to subscriber line 976 through interconnect 945, and line 928 is coupled to subscriber line 978 through interconnect 945. Moreover, note that as illustrated, various parts of interconnect 945 are used, rather than a dedicated portion of interconnect 945. However, a dedicated portion of interconnect 945 may also be set aside, either in advance, or by virtue of connection in sequence to a sequence of lines such as lines 922, 924, 926 and 928.

Some of the provisioning and deployment obstacles in introducing MIMO technologies into the network are described above. In particular, challenges are associated with the transition phase, where only a few users of the new technology exist in the network and the majority of users employ legacy equipment. Carefully designed deployment processes have been described that can provide the MIMO performance gains even for the very first few users of the new technology.

From the foregoing, it will be appreciated that specific embodiments of the invention have been described herein for purposes of illustration, but that various modifications may be made without deviating from the spirit and scope of the invention. For example, the disclosed method for allocating network resources is not limited to MIMO technologies, but can be used for any new technology (e.g., spectral shaping, dynamic spectral balancing or dynamic spectrum management for example) that can benefit from aggregating all or most links supporting the new technology into separate binders. In some instances, reference has been made to characteristics likely to be present in various or some embodiments, but these characteristics are also not necessarily limiting on the spirit and scope of the invention. In the illustrations and description, structures have been provided which may be formed or assembled in other ways within the spirit and scope of the invention. Likewise, other technologies may have similarities and differences to the illustrative MIMO technology while benefiting from the methods and/or apparatuses of the present invention.

In particular, the separate modules of the various block diagrams represent functional modules of methods or apparatuses and are not necessarily indicative of physical or logical separations or of an order of operation inherent in the spirit and scope of the present invention. Similarly, methods have been illustrated and described as linear processes, but such methods may have operations reordered or implemented in parallel within the spirit and scope of the invention. Accordingly, the invention is not limited except as by the appended claims.

We claim:

1. A method of installing new technology in an existing geographical distributed network, comprising:

dedicating network resources of the geographically distributed network for the new technology to produce dedicated network resources of the geographically distributed network, wherein the new technology includes at least one of Multiple-Input-Multiple-Output (MIMO), spectral shaping, dynamic spectral balancing, or dynamic spectrum management, and wherein the network resources include a previously existing plurality of binders, each binder including a plurality of twisted copper wires;

installing a central component for the new technology at a centralized network facility of the geographically distributed network, wherein the central component includes a transceiver associated with a particular new technology;

coupling the dedicated network resources of the geographically distributed network to the central component, wherein the transceiver associated with a particular new technology is connected to the plurality of twisted copper wires of the existing geographically distributed network so as to incorporate the new technology in the existing geographically distributed network;

coupling a subset of the dedicated network resources to a subscriber of the new technology, wherein a subset of the dedicated network resource assigned for the new technology is coupled to a local interconnect of the existing network such that the plurality of twisted copper wires of the subscriber is connected to the local interconnect, wherein the plurality of existed copper wires of the subscriber is coupled to the subset of the dedicated network resources; and installing subscriber equipment for the new technology at a site used by the subscriber, wherein the plurality of twisted copper wires of the subscriber to the subscriber equipment of the new technology, wherein the subscriber equipment of the new technology includes transceivers suited for operation with at least one of MIMO, spectral shaping, dynamic spectral balancing, or dynamic spectrum management technologies.

2. A method of installing new technology in an existing geographically distributed telecommunication network, comprising:

dedicating telecommunication network resources of the geographically distributed telecommunication network for the new technology to produce dedicated telecommunication network resources of the geographically distributed telecommunication network, wherein the new technology includes at least one of Multiple-Input-Multiple-Output (MIMO), spectral shaping, dynamic spectral balancing, or dynamic spectrum management, and wherein the telecommunication network resources include a previously existing plurality of binders, each binder including a plurality of twisted copper wires;

installing a central component for the new technology at a centralized telecommunication network facility of the geographically distributed telecommunication network, wherein the central component includes a transceiver associated with a particular new technology;

coupling the dedicated telecommunication network resources of the geographically distributed telecommunication network to the central component, wherein the transceiver associated with a particular new technology is connected to the plurality of twisted copper wires of the existing geographically distributed telecommunication network so as to incorporate the new technology in the existing geographically distributed telecommunication network;

coupling a subset of the dedicated telecommunication network resources to a subscriber of the new technology, wherein a subset of the dedicated telecommunication network resource assigned for the new technology is coupled to a local interconnect of the existing telecommunication network such that the plurality of twisted copper wires of the subscriber is connected to the local interconnect, wherein the plurality of twisted copper wires of the subscriber is coupled to the subset of the dedicated telecommunication network resources; and installing subscriber equipment for the new technology at a site used by the subscriber, wherein the plurality of twisted copper wires of the subscriber to the subscriber equipment of the new technology, wherein the subscriber equipment of the new technology includes transceivers suited for operation with at least one of MIMO, spectral shaping, dynamic spectral balancing, or dynamic spectrum management technologies.

3. A method of installing new spectral shaping, new dynamic spectral balancing, or new dynamic spectrum management technologies in an existing geographically distributed telecommunication network, comprising:

dedicating telecommunication network resources of the geographical distributed telecommunication network for new spectral shaping, new dynamic spectral balancing, or new dynamic spectrum management technologies to produce dedicated telecommunication network resources of the geographically distributed telecommunication network, wherein the telecommunication network resources include a previously existing plurality of binders, each binder including a plurality of twisted copper wires;

installing a central component for the new technology at a centralized telecommunication network facility of the geographically distributed telecommunication network, wherein the central component includes a transceiver associated with new spectral shaping, new dynamic spectral balancing, or new dynamic spectrum management technologies;

coupling the dedicated telecommunication network resources of the geographically distributed telecommunication network to the central component, wherein the transceiver associated with a particular technology is connected to the plurality of twisted copper wires of the existing geographically distributed telecommunication network so as to incorporate one of the new spectral shaping, new dynamic spectral balancing, or new dynamic spectrum management technologies in the existing geographically distributed telecommunication network;

coupling a subset of the dedicated telecommunication network resources to a subscriber of the new technology, wherein a subset of the dedicated telecommunication network resource assigned for the new technology is coupled to a local interconnect of the existing telecommunication network such that the plurality of twisted copper wires of the subscriber is connected to the local interconnect, wherein the plurality of twisted copper wires of the subscriber is coupled to the subset of the dedicated telecommunication network resources; and installing subscriber equipment for the new spectral shaping, new dynamic spectral balancing, or new dynamic spectrum management technologies at a site used by the subscriber, wherein the plurality of twisted copper wires of the subscriber to the subscriber equipment of the new technology, wherein the subscriber equipment of the new technology includes transceivers suited for operation with at least one of the new spectral shaping, new dynamic spectral balancing, or new dynamic spectrum management technologies.

\* \* \* \* \*